United States Patent [19]
Corey et al.

[11] Patent Number: 5,987,446
[45] Date of Patent: Nov. 16, 1999

[54] SEARCHING LARGE COLLECTIONS OF TEXT USING MULTIPLE SEARCH ENGINES CONCURRENTLY

[75] Inventors: Douglas A. Corey; Thomas K. Landauer; Karen E. Lochbaum, all of Boulder, Colo.

[73] Assignees: U.S. West, Inc., Denver; MediaOne Group, Inc., Englewood, both of Colo.

[21] Appl. No.: 08/747,298

[22] Filed: Nov. 12, 1996

[51] Int. Cl.$^6$ ...................................................... G06F 17/30
[52] U.S. Cl. .................................................. 707/3; 707/5
[58] Field of Search ................... 707/4, 5, 1, 3

[56] References Cited

U.S. PATENT DOCUMENTS

| | | | |
|---|---|---|---|
| 4,839,853 | 6/1989 | Deerwester et al. | 364/900 |
| 5,301,109 | 4/1994 | Landauer | 364/419.19 |
| 5,619,709 | 4/1997 | Caid et al. | 395/794 |
| 5,642,502 | 6/1997 | Driscoll | 707/5 |

OTHER PUBLICATIONS

"Esq., The Legal Basics", Lexis–Nexis Search Guide, No Date.

Lochbaum et al., 1989, *Information Proc. & Man.*, 25(6):665–76.

Liddy et al. "DR_LINK System: Phase I Summary" Tipster Proceedings of the First Workshop, pp. 93–112, conf date Sep. 1993, Apr. 1994.

Liddy et al. "DR–LINK: A System Update for TREC–2", TREC–2 Text retrieval Caonfrence, pp. 85–99, Sep. 1993.

Al–Hawamdeh et al. "Compound Document Processing System", Proceedings of the Fifteenth Anual International Computer software and Applications Conference pp. 640–644, Sep. 1991.

Salton, G. et al. "A Vector Space Model for Automatic Indexing", Commun. ACM, vol. 18, No. 11, pp. 613–620, Nov. 1975.

*Primary Examiner*—Jack M. Choules
*Attorney, Agent, or Firm*—Holme Roberts & Owen LLP

[57] ABSTRACT

An information retrieval system is disclosed, wherein the system includes a plurality of text search engines based on substantially different computational searching techniques. By activating each search engine with input from a user information request, the output from each of the search engines is combined into a single list of information items. A ranking process ranks the information items in the combined list by utilizing information item ordering data also received from each of the search engines as to the relevance of the information items output by the search engine to the user's request. Thus, by providing higher rankings to those information items determined to be most relevant to the user's request by each of (or a majority of) the search engines, these information items have been found to be highly consistent in satisfying the user's request for information.

29 Claims, 11 Drawing Sheets

SEARCHING LARGE COLLECTIONS OF TEXT USING MULTIPLE SEARCH ENGINES CONCURRENTLY

FIELD OF THE INVENTION

The present invention relates to text searching techniques wherein multiple search engines are utilized in searching for one or more desired information items.

BACKGROUND OF THE INVENTION

Searching large collections of text based information items, such as archives of publications or commercial listings such as telephony yellow pages, for entries related to a particular subject can be time consuming and frustrating. Accordingly, such large collections have been incorporated into data bases and various computerized searching strategies (denoted herein "search engines") have been developed to assist a user in searching for desired information items. However, many times the search strategy provided does not easily satisfy a user's need to locate the desired information items quickly and simply. For example, a large number of such search strategies or search engines are based on character string matching algorithms and typically require the user to specify a potentially complex Boolean expression of character strings so that such a search engine can match with corresponding character strings in stored information items and subsequently evaluate the Boolean expression to determine whether a particular information item is to be provided to the user. Note that such matching search engines (denoted herein "literal search engines") may provide a reasonably concise searching capability for sophisticated users to retrieve a desired information item, or alternatively to determine that such an information item does not exist. However, it is desirable to utilize such search engines with relatively simple expressions and still provide the user with the accuracy obtained from more sophisticated search expressions.

Alternatively, text based search engines have also been developed wherein the search engines attempt to search information items based on the content or semantics of the information items. These search engines have a much more difficult task to perform in that it has been non-trivial to computationally determine the semantics of information items effectively for a wide range of users. Accordingly, various techniques have been employed in such search engines including various statistical techniques for relating the content of one stored information item to the content of one or more other stored information items. Accordingly, an important characteristic of such content based search engines (hereinafter also referred to as semantic similarity search engines) is that the relating of the information items to one another allows for retrieval of information items that are related to the terms in a user request even though the retrieved information items may have none of the user input terms. For example, a user requesting information regarding "green wool sweaters" might obtain an information item related to "emerald cashmere pullovers." Thus, as this example illustrates, a user may be presented with unexpected or undesired information items as well as more relevant information items. However, this type of search engine offers a significant advantage in that typically, the expressions input by a user are simple lists of words and/or phrases. Thus, these search engines have been of particular benefit to unsophisticated users.

Since each of the above types of search engines retrieve information items in substantially different ways, a synergistic combining of such search engines into a single information retrieval system would be advantageous. In particular, it would be advantageous to have such an information retrieval system wherein relatively simple user information requests may be provided and subsequently a ranked listing of information items is output to the user, wherein this listing has both the narrowness of focus provided by a literal search engine, and also provides the user with information items having a related content that also appears to be relevant to the user.

SUMMARY OF THE INVENTION

The present invention is a novel text based method and system for retrieving information items from a (potentially) large collection of stored information items such as publications and/or descriptions of business entities. In particular, the present invention includes an information retrieval system that synergistically utilizes at least two substantially different searching techniques or search engines for responding to an input query with retrieved information items that appear most likely to satisfy the query. That is, in response to an input query, the novel information retrieval system of the present invention activates each of a plurality of different search engines with the query (or portions thereof) for retrieving potentially different groups of information items and subsequently combining the groups and ranking the combined retrieved information items so that the higher ranked information items are estimated to be more likely to satisfy the person who desires the information and therefore are output as a response to the input query before any other information items may be output.

Accordingly, in one embodiment of the present invention, two text search engines are utilized having distinctly different text searching techniques. That is, a first search engine is provided wherein the searching technique includes methods for selecting a first set of one or more particular information items based solely on the literal content of each of the individual information items. That is, the selection of each information item may be accomplished independently of the content of other stored information items. Additionally, a second search engine is provided wherein the search technique includes methods for evaluating the likely relevance of one or more information items based on the analysis of the content of many other stored information items instead of just the individually selected information items.

In a more specific embodiment, the first search engine may select for retrieval only those information items wherein each such information item includes an occurrence of a representation of literal query terms from an input query. Note that hereinafter such a searching technique will be denoted as a "literal" search strategy or search engine. Additionally, in this more specific embodiment, the second search engine may be, for example, based on a statistical analysis of terms (e.g., words and/or phrases) occurring in the stored information items. Accordingly, the stored information items may be evaluated for similarity to one another according to a statistical analysis of the pattern of the terms occurring in the stored information items as well as additional related information items that may be used exclusively for performing the statistical analysis. Thus, for example, by supplying such a second search engine with a set of terms as a query and subsequently considering the query as another such information item, a determination may be made as to the relevance of the stored information items to the query according to the similarity measurement provided by the statistical analysis. That is, the relevance of an information item to the query is dependent upon the pattern of occurrences of the query terms within the aggregate collection of the stored information items (and any additional information items used exclusively for performing the statistical analysis). Note that hereinafter such a searching technique or search engine based on aggregate information obtained from stored information items is denoted as a "semantic similarity" search strategy or search engine. In particular, the statistical analysis provided by such a second search engine may utilize a singular value decomposition technique for determining a "relatedness" between the stored information items so that subsequently a query can also be similarly related to the information items for retrieving information items judged to be closely related to the query.

Regarding the ranking of information items subsequent to retrieval by the plurality of search engines, it is an aspect of the present invention to rank the retrieved information items by utilizing any relevancy ordering of the information items provided by the search engines for indicating which of the combined collection of retrieved information items are considered more relevant (i.e., ordered higher) than other retrieved information items (which are ordered lower). For example, referring again to the literal and semantic similarity search engines of the embodiment described above, such relevancy orderings may be provided by both search engines. That is, for the literal search engine a relevancy ordering, $<_k$, is obtained by partitioning the group of information items retrieved from this search engine, wherein each partition, $P_N$, includes (or references) the information items having at least one occurrence of a representation of each of exactly N of the query terms in an input query. Thus, the list: $<P_1, P_2, \ldots >$ of partitions orders the information items therein such that for information items:

$r_i \in P_i$ and $r_j \in P_j$, $r_i <_k r_j$ if and only if i is less than j.

Additionally, for a semantic similarity search engine as described above, a relevance ordering, $<_c$, is obtained by determining a metric for measuring "relatedness" in a "reduced dimensional" statistical vector space having a reduced dimensionality (in comparison to, e.g., a vector space relating substantially every term in the stored information items to the information item containing the term). That is, the phrase "reduced dimensionality" used herein refers to the vector space derived from a statistical analysis wherein each information item is represented by a smaller number of vector coordinates than the lesser of the total number of unique word types contained in all of the information items in the collection and the total number of information items in the collection. In particular, one such relatedness metric that may be utilized is the angle between a vector, $V_r$, representing a content of an information item, r, (relative to the content of other information items) and a vector, $V_q$, representing an input query. That is, the smaller the angle, the more relevant the information item is presumed to be. Thus, assuming only information items are retrieved whose corresponding vectors have a relatively small angle with $V_q$, the ordering $<_c$ can be defined as, $r_i <_c r_j$ if and only if the angle between $V_{r_i}$ and $V_q$ is less than the angle between $V_{r_j}$ and $V_q$. Note, however, that the relevancy ordering according to this angular metric is but one of many that may be applied to the statistical vector space described hereinabove.

By utilizing a literal search engine and a semantic similarity search engine with the orderings $<_k$ and $<_c$, respectively, these orderings may be utilized for generating a ranking, $<_R$, of the information items that are to be presented as a response to a query to the information retrieval system. For instance, the following ranking may be derived: for information items (or references for accessing the information items) $r_i$ and $r_j$, $r_i <_R r_j$ if and only if (a) $r_i, r_j \in P_m$ for some m=1, 2, . . . , and $r_i <_c r_j$, or (b) $r_i \in P_m$ and $r_j \in P_n$ and m<n.

It is important to note, however, that other rankings may also be provided from such literal and semantic similarity search engine outputs as well as from other search engines as one skilled in the art will appreciate.

In another aspect of the present invention, upon presentation of one or more information items retrieved from the ranked output from the above discussed search engines, the user may be provided with the ability to identify certain of the presented information items and provide a "more like these" request. That is, this "more like these" retrieval retrieves one or more other information items that are determined to be closely related to the identified information items. In particular, in one embodiment of the present invention, the determination of the closely related information items is performed using exclusively the semantic similarity search engine described above.

It is also an aspect of the present invention that the stored information items can be included in a large data base of documents, publications or records wherein the information retrieval system of the present invention reduces user time spent navigating through such a database in search of a particular information item. For example, the information items may be technical publications, advertisements or references for providers of goods or services. It is a particularly important aspect of the present invention to apply the present information retrieval system to a database having information items corresponding to entries in the yellow pages of a telephony provider. Moreover, it is an additional aspect of the present invention to provide access to such a yellow pages database through the Internet whereby the information retrieval system included in the present invention can be utilized on-line for retrieving ranked yellow page entries wherein higher ranked entries are expected to more likely provide the information desired by an Internet on-line user than lower ranked entries. Other features and benefits of the present invention will become apparent from the detailed description with the accompanying figures contained hereinafter.

DETAILED DESCRIPTION

Figure 1:
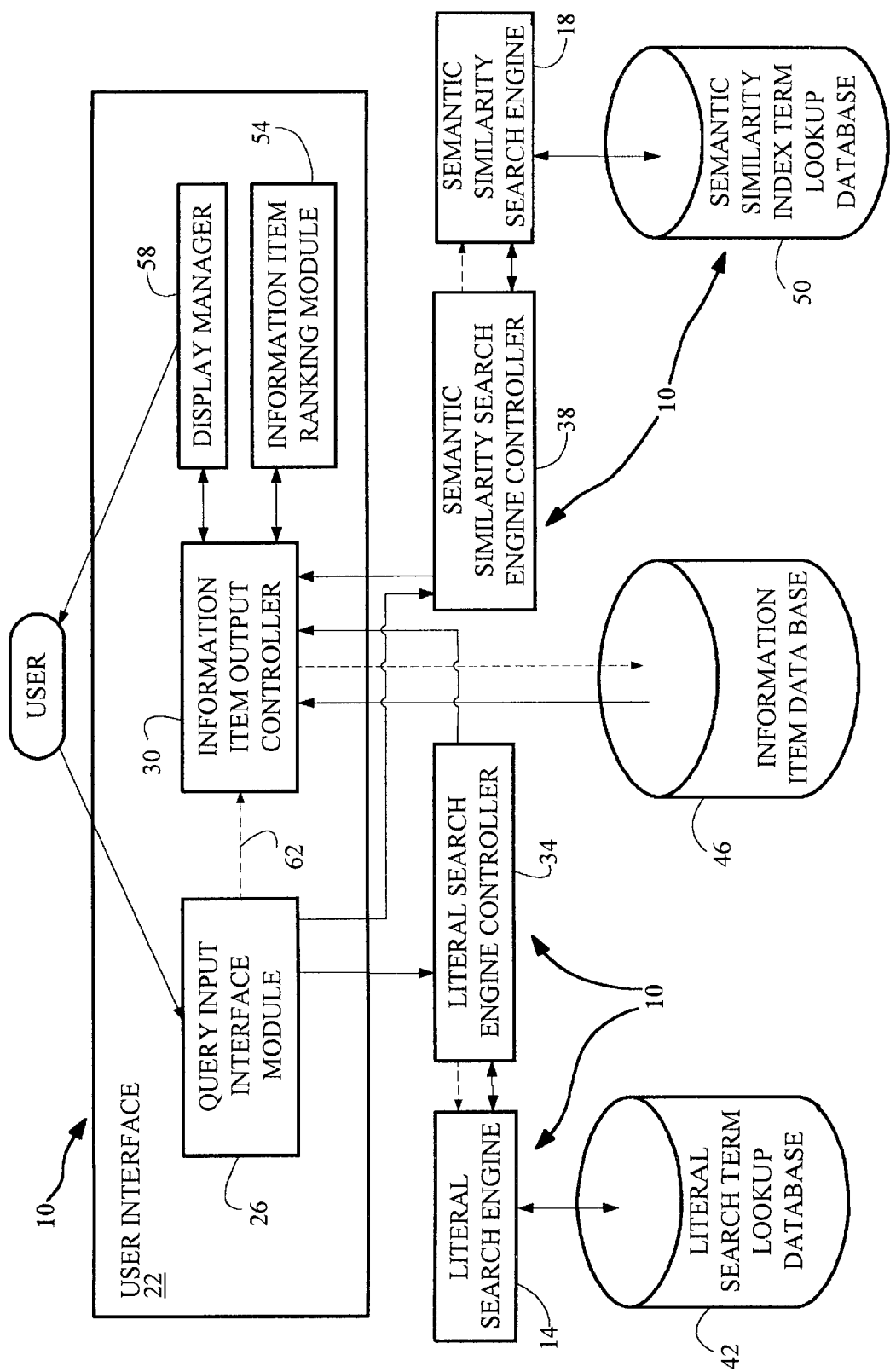
FIG. 1 is a block diagram illustrating the components or modules of the information retrieval system 10 of the present invention.

FIG. 1 presents a block diagram of the information retrieval system 10 of the present invention, wherein there are two search engines, a literal search engine 14 and a semantic similarity search engine 18. Accordingly, a user utilizes the present invention by activating the user interface subsystem 22 incorporated into the information retrieval system 10. In particular, the user inputs a query for desired information to the user interface 22 and the query is provided to the query input interface module 26 for distributing to each of the search engines an appropriate query as detailed hereinbelow. Note that a query input by the user may take on different forms depending on the embodiment of the present invention. For example, such a user query may be a sequence of terms and phrases that the user believes is associated with the information items desired. Alternatively, the user may input sentences describing the information items desired and the query input interface module 26 analyzes such sentences for the purpose of extracting terms from which queries to the search engines can be generated. Additionally, the query input interface module 26 also provides control information to other modules such as the information item output controller 30 as will be discussed hereinbelow. Upon transforming the user query into queries acceptable to the various search engines incorporated into the present invention, the query input interface module 26 outputs these queries to their corresponding search engine controllers such as the literal search engine controller 34 and the semantic similarity search engine controller 38. Each of these controllers control or manage the activation and performance of their associated search engine as well as formatting search engine output so that it is acceptable to other modules of the present invention. In particular, the literal search engine controller 34 controls or manages the literal search engine 14, supplies queries to the literal search engine and receives indexing information related to information items satisfying a corresponding input query. Correspondingly, the literal search engine 14, upon receiving commands and query data from the literal search engine controller 34, performs a search on the search term lookup data base 42 for determining references or indexes to information items that satisfy the query input to the literal search engine 14. More particularly, the literal search engine 14 may be viewed as a substantially conventional text string matching search engine that is designed for searching a data base of, for example, term-information item pairs wherein the term of such a pair occurs one or more times in the information item of the pair. Accordingly, the search term lookup data base 42 is structured in such a manner so as to be compatible with the processing performed by the literal search engine 14. Thus, the literal search engine 14 supplies the literal search engine controller 34 with output from a corresponding input query that consists of a list of references for information items to be eventually retrieved from the information item data base 46 that stores the information items to which the user is directing a query and from which the search term lookup data base 42 is generated.

Upon receiving a list of one or more information item references from the literal search engine 14, the literal search engine controller 34 subsequently performs any necessary data structure transformations necessary for communicating the list of references to other modules of the present invention. That is, since it is an aspect of the present invention that third party or commercial text search engines may be integrated into the present invention, it is the responsibility of the corresponding search engine controller to output a uniform representation of information item references that is compatible with other modules of the present invention.

Referring now to the modules associated with the semantic similarity text searching functionality of the present invention, upon receiving a query from the query input interface module 26, the semantic similarity search engine controller 38 performs any required data representation transformations to the query and subsequently inputs and activates the semantic similarity search engine 18 for performing a statistical analysis to determine references to information items stored in the information item data base 46 that are "close" to a corresponding statistical representation of the query. Accordingly, the semantic similarity search engine 18 utilizes a semantic similarity index term lookup data base 50 which stores statistical vector representations of each information item in the information item data base 46 and associates each statistical vector with a corresponding index into this data base for retrieving the corresponding information item. Note that in one embodiment of the present invention, the semantic similarity search engine together with its associated data base 50 is an implementation of the text retrieval system disclosed in U.S. Pat. No. 4,839,853 by Deerwester et al., incorporated herein by reference. Further, to more fully appreciate the distinctions between the semantic similarity search engine 18 and the literal search engine 14, an example of the use of the Deerwester text retrieval system is provided in the simple example illustrating the semantic similarity engine 18 presented hereinafter.

Referring now to the information item output controller 30, this module controls the retrieval of information items from the information item data base 46 and the subsequent ranking and displaying of information items deemed most likely to satisfy the user's query. In particular, the information item output controller 30, upon receiving an information item reference list from one or both of the search engine controllers 34 and 38, performs one of the following:

(a) if both search engine controllers 34 and 38 supply information item reference lists to the information item controller 30 as a response to a new user query, the information item controller, in turn, activates the information item ranking module 54 for providing ranking of the information items obtained from combining the two reference lists supplied to the information item output controller 30. In this context, it is important to note that as described above, the output from each of the search engine controllers includes order information that orders the information item reference list according to a predetermined measurement or procedure for determining a likelihood that the information item for each reference will contain the information desired by the user. Accordingly, this ordering information is also passed to the information item ranking module 54 for use in generating a single, combined, ranked list of information items from which at least the highest ranked (i.e., most relevant) information item is retrieved by the information item output controller 30 from the information item data base 46 and subsequently supplied to the display manager 58 for displaying to the user; and (b) instead of providing a new query, the user may request additional information items similar to one or more information items that have already been presented to the user; i.e., a "more like these" request. In this context of the present invention, the information item output controller 30 receives a reference list from only the semantic similarity search engine controller 38 and therefore is alerted to the fact that a single reference list is to be expected by control signals from the query input interface module via the dashed line 62. Thus, in this case, the information item output controller 30 activates the information item ranking module 54 with the single reference list, and subsequently, upon receiving output from the module 54, supplies at least the most relevant of the "more like these" information items to the display manager 58 for displaying to the user.

Figure 2:
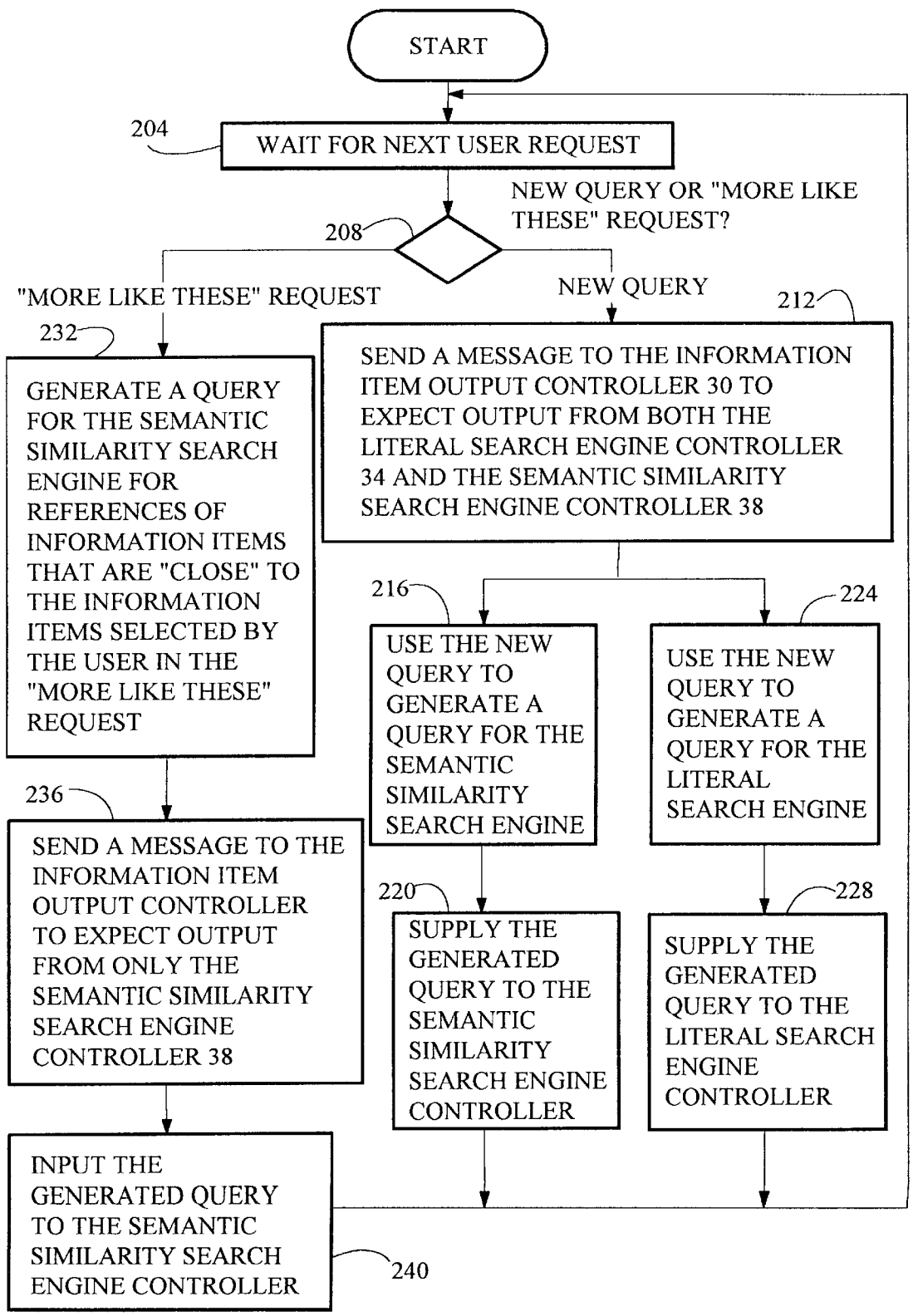
FIG. 2 is a high level flow chart illustrating the steps performed by the query input interface module of the present invention.

In FIG. 2, a flowchart is presented of the high level steps performed by the query input interface module 26 when receiving input from the user. Accordingly, in step 204, the query input interface module 26 waits for a next user request to be input. Subsequently, assuming a user request is input, in step 208, a determination is made as to whether the input is a new query or a "more like these" request. Assuming for the moment that the user input is a new query, then step 212 is performed wherein a message is sent to the information item output controller 30 for alerting this module to expect output from both the literal search engine controller 34 and the semantic similarity search engine controller 38. Subsequently, the query input interface module 26 generates a new query for each of the search engines 14 and 18 and provides the generated queries to the corresponding search engine controller 34 and 38 as shown in steps 216 through 228. Subsequently, after supplying these queries, the query input interface module 26 returns to step 204 and waits for a next user input.

Alternatively, if in step 208 it is determined that the user has input a "more like these" request, then step 232 is performed wherein a query is generated to the semantic similarity search engine for retrieving references of information items that are "close" to the information items selected by the user in activating the "more like these" request. Subsequently, in step 236, the query input interface module 26 sends a message to the information item output controller 30 alerting this module to expect output from only the semantic similarity search engine controller 38. Finally, in step 240, the query input interface module 26 supplies the query generated in step 232 to the semantic similarity search engine controller 38 and subsequently returns to step 204.

Figure 3A:
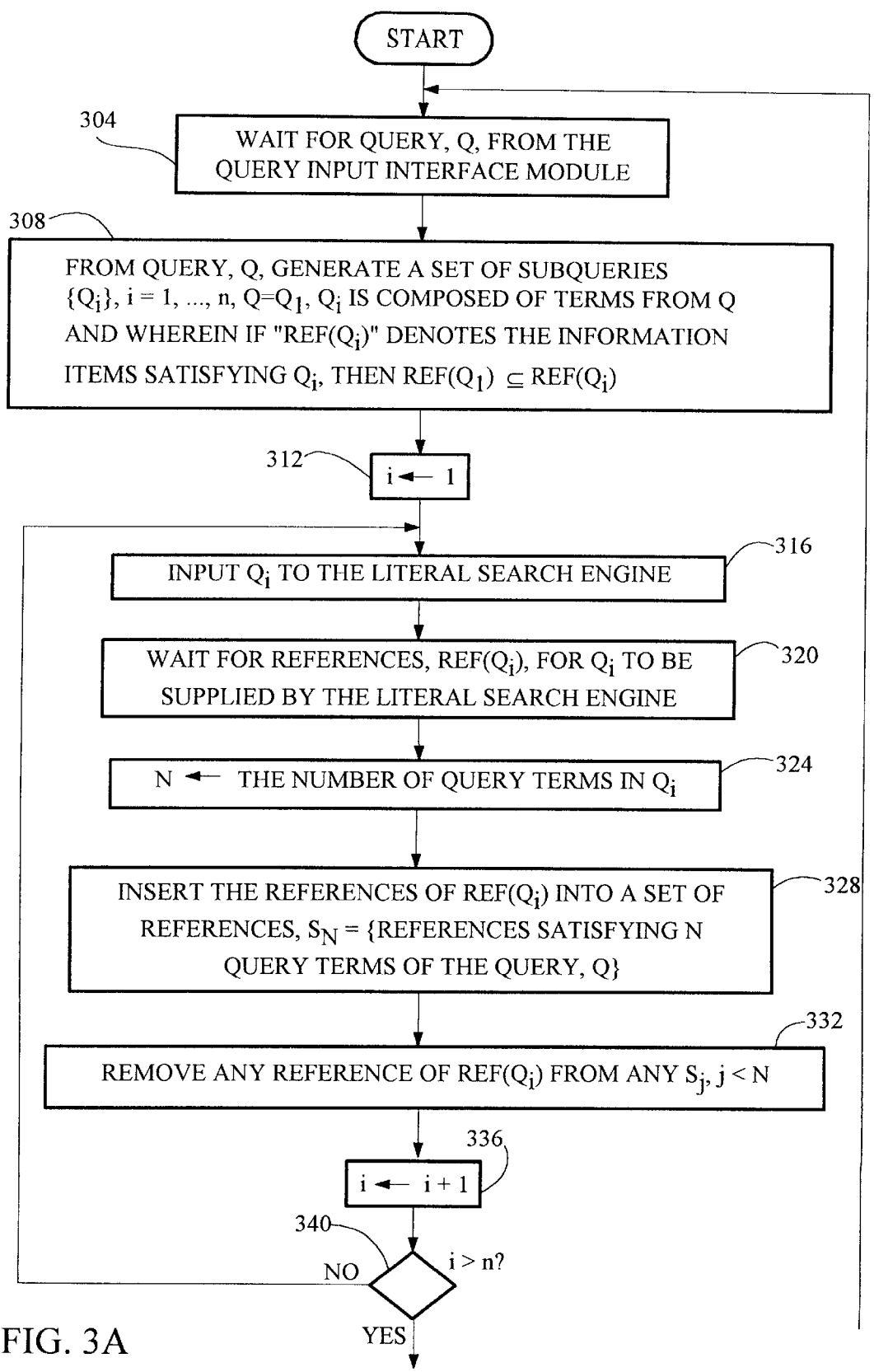
FIGS. 3A and 3B provide a flow chart of the high level steps performed by the literal search engine controller of the present invention.
Figure 3B:
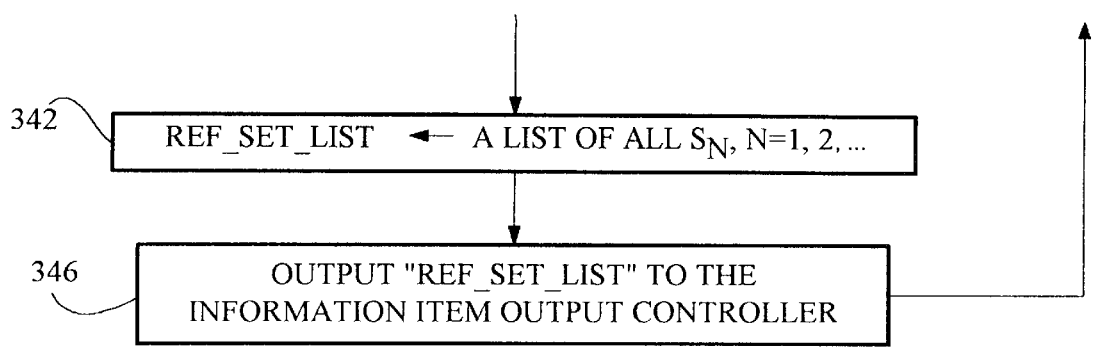

FIGS. 3A and 3B provide the high level steps of the flowchart for the processing performed by the literal search engine controller 34. Accordingly, in step 304, the search engine controller 34 waits for an input query from the query input interface module 26. Assuming such a query is entered, in step 308, the input query is used to generate a set of subqueries $\{Q_i\}$, i=1 ..., n, wherein each $Q_i$ is a subquery generated from the original input query. In particular, if Q is the original input query, then $Q=Q_1$ and $Q_i$, for each i greater than 1, is a query having one or more query terms from Q removed. That is, assuming that Q is a conjunction of query terms, each $Q_i$ may be viewed as a subconjunction of query terms. Thus, if the information item references satisfying a query $Q_k$ in the search term lookup data base 42 is denoted by REF($Q_k$), then the following set theoretic equation holds, REF($Q_1$)⊆, REF($Q_i$), i=1 ..., n. Moreover, note that in some embodiments of the present invention, the number of queries generated in the present step is substantially all combinations of conjunctions that can be generated from the query Q, assuming that there are a relatively small number of terms in Q.

Subsequently, in steps 312 through 340, each of the generated queries is supplied to the literal search engine 14 and the references retrieved by the search engine from the search term lookup data base 42 are collected into a series of sets denoted $S_N$ in step 328. In particular, each such set of references $S_N$ includes all information item references that satisfy a subquery of Q (the original query) having N of the query terms from Q. However, since it is desirable that no information item reference be in more than one of the set of references $S_N$, and since it is also desirable for each reference to be included in the $S_i$, wherein i is the largest value possible, in step 332, any information item reference inserted into $S_N$ is now removed from any $S_j$ less than N. That is, each retrieved reference is an element of only the $S_N$ that is the best approximation possible to the original query and still contains the reference.

Subsequently, once all subqueries $Q_i$ have been processed in the loop of steps 316 through 340, a list of all reference sets $S_N$ is assigned to the variable REF_SET_LIST, and this list of sets is output to the information controller 30 in step 346. Finally, the flow of control for the present flowchart loops back to step 304 in preparation for a next input query from the query input interface module 26.

Figure 4:
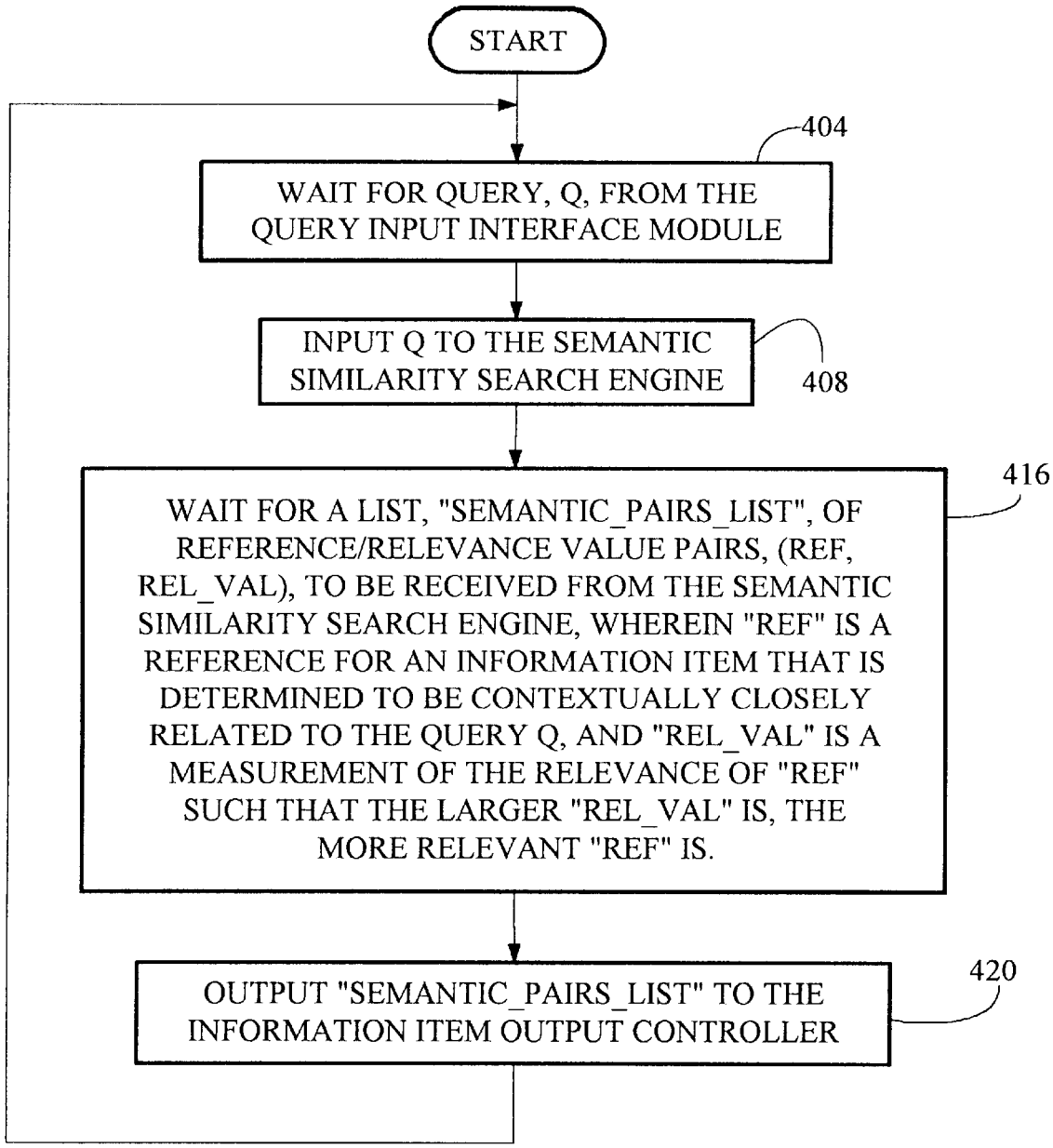
FIG. 4 is a flow chart of the high level steps performed by the semantic similarity engine controller of the present invention.

FIG. 4 presents a flowchart of the high level steps performed by the semantic similarity search engine controller 38. Accordingly, in step 404, the search engine controller 38 waits for a next query Q to be supplied by the query input interface module 26. Assuming such a query Q is input, the search engine controller 38 inputs this query (or an equivalent translation thereof) to the semantic similarity search engine 18 for retrieving information item references from the lookup data base 50 that are "close" to the representation of the query Q in the statistical vector space also having vector representations of the content of each information item and as described in detail in the simple example illustrating the semantic similarity engine 18 presented hereinafter. Subsequently, in step 416, the search engine controller 38 waits for an output from the semantic similarity search engine 18. In particular, note that each reference retrieved by the semantic similarity search engine 18 is paired with a relevance value, wherein the relevance value is a measure of the estimated relevance of the reference to the input query. Note that in one embodiment of the semantic similarity search engine 18, once the query has been mapped into the statistical vector space (as described in the simple example illustrating the semantic similarity engine 18), any one of a number of measurements may be used to determine closeness between the vector for the query and the vectors for the information items. One such measurement used is the cosine between the query vector and the vectors for each of the information items so that when the cosine between these vectors is, for example, greater than 0.90, the reference for the information items is retrieved from the lookup data base 50. Alternatively, any comparison metric between such vectors may be used, including distance measurements (such as Euclidean or dot product) and/or angular measurements. For ease of explanation and consistency with the description in simple example illustrating the semantic similarity engine 18, it is presumed that the cosine measurement for relevance is utilized herein. Accordingly, the output from the semantic similarity search engine 18 to the search engine controller 38 is a list of reference/relevance value pairs (REF, REL_VAL) wherein, "REF" is a reference for an information item whose cosine with the query vector is greater than or equal to (for example) 0.90, and "REL_VAL" is the value of this cosine measurement of relevance. Accordingly, the larger the value of REL_VAL, the more relevant the corresponding REF is likely to be in satisfying the input query. Finally, in step 420, the list of reference/relevance value pairs received by the search engine controller 38 is output to the information item output controller 30 and is denoted as the "SEMANTIC_PAIRS_LIST". Subsequently, the semantic similarity search engine controller 38 returns to 404 in preparation for a next query input from the query input interface module 26.

Figure 5:
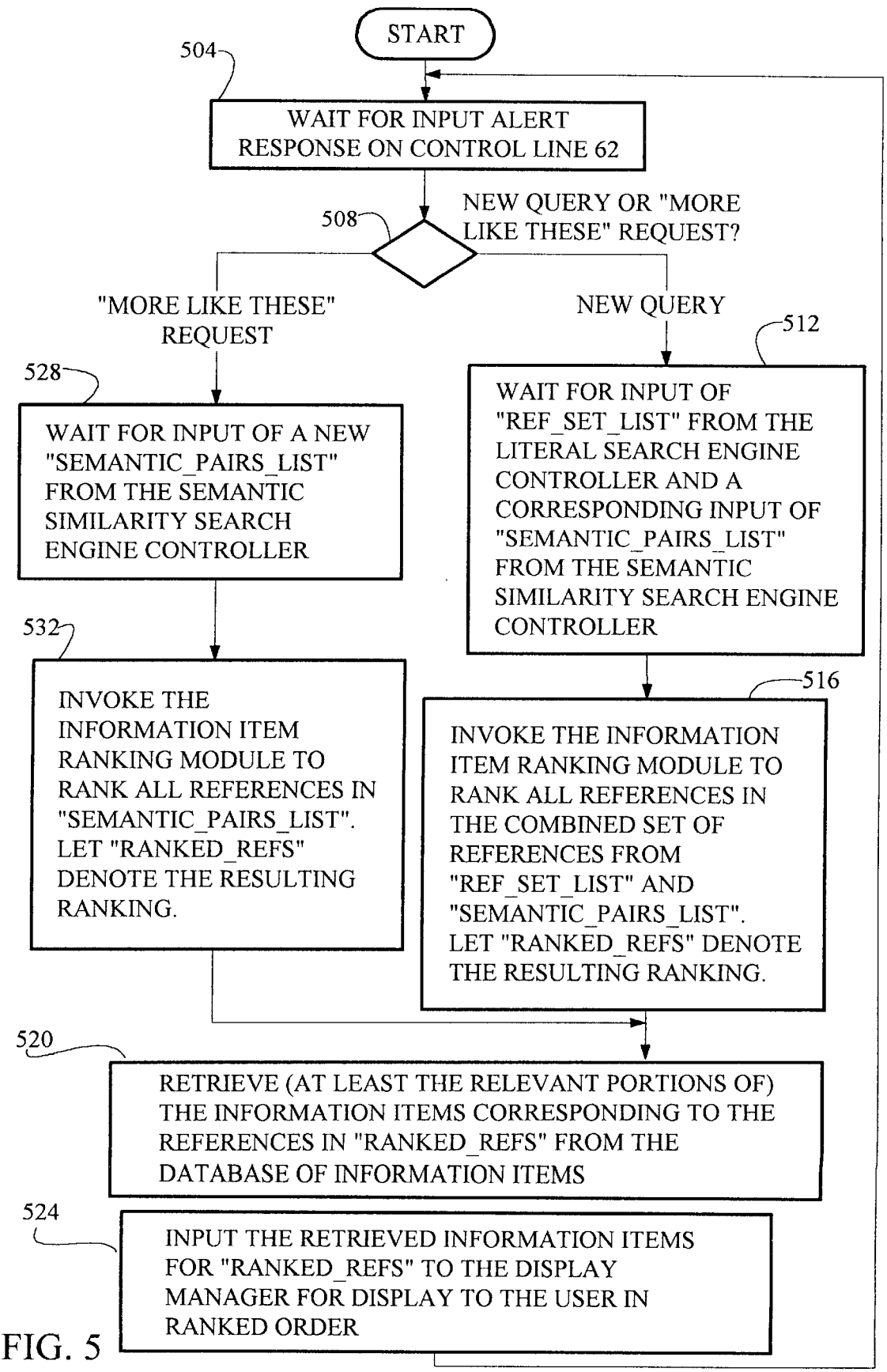
FIG. 5 is a flow chart of the high level steps performed by the information item output controller.

FIG. 5 is a flowchart presenting the high level steps performed by the information item output controller 30. Accordingly, in step 504, the information item output controller 30 waits for an input alert response on the control line 62 from the input interface module 26. In particular, signals on line 62 alert the information item output controller 30 that a new user request has been entered. Accordingly, line 62 is used to signal the information item output controller 30 as to whether a new query has been entered by the user or a "more like these" request has been entered by the user. Subsequently, in step 508, the information item output controller 30 determines which of the two alerts have been received. Assuming that a new query alert has been received, then in step 512, the information item output controller 30 is configured to expect output from both the literal search engine controller 34 and the semantic similarity search engine controller 38. Assuming that inputs from both search engines are provided to the information item output controller 30, in step 516, the information item output controller 30 activates the information item ranking module 54 to rank all references in the combined set of references output by the search engine controllers. That is, the reference list REF_SET_LIST from the literal search engine controller 34 and the SEMANTIC_PAIRS_LIST reference list from the semantic similarity search engine controller 38 are provided to the information item ranking module 54 and consequently a single ranked list, RANKED_REFS, is output to the information item output controller 30 by the information item ranking module 54. Further note that the steps in providing the single ranking of these two reference lists is discussed hereinbelow in reference to FIGS. 6A–6C.

Following step 516, in step 520, the information item output controller 30 accesses the information item data base 46 to retrieve at least the relevant portions of the information items corresponding to one or more of the highest ranked references in RANKED_REFS. Note that in one embodiment of the present invention wherein the information items are yellow page entries, and the user is connected to the present invention by the Internet, then the information items are likely to include graphical displays as well as informative and advertising text for display at the user's Internet browser. Accordingly, in step 524, the information item output controller 30 supplies the retrieved information items to the display manager 58 for outputting to the user in ranked order. Note that if the display manager 58 communicates with the user via the Internet, then the display manager may utilize a hypertext transfer protocol daemon for interfacing with the Internet and additionally the display manager may include or have access to a plurality of common gateway interface programs activated via the hypertext transfer protocol daemon for translating the ranked information items into hypertext markup language forms for transferring on the Internet. Subsequently, after the information item output controller 30 has provided the ranked references to the display manager 58, the controller 30 loops back to step 504 in preparation for a next input alert on line 62.

Referring once again to step 508, if the information item output controller 30 determines that a "more like these" request has been entered by the user, then step 528 is performed wherein the information item output controller 30 is configured to expect a reference list from only the semantic similarity search engine controller 38. Assuming that the reference list, SEMANTIC_PAIRS_LIST, is output by the search engine controller 38, in step 532 the information item output controller 30 activates the information item ranking module 54 to rank the list of references in SEMANTIC_PAIRS_LIST. Note, however, since only one reference list is input to the information item ranking module 54, this module ranks the references according to the order determined by the semantic similarity search engine 18. That is, for pairs (REF$_j$, REL_VAL$_j$) and (REF$_k$, REL_VAL$_k$), the information item ranking module 54 ranks REF$_j$ higher than REF$_k$ whenever REL_VAL$_j$ is greater than REL_VAL$_k$. Subsequently, steps 520 and 524 are performed in the same manner as discussed above.

Figure 6A:
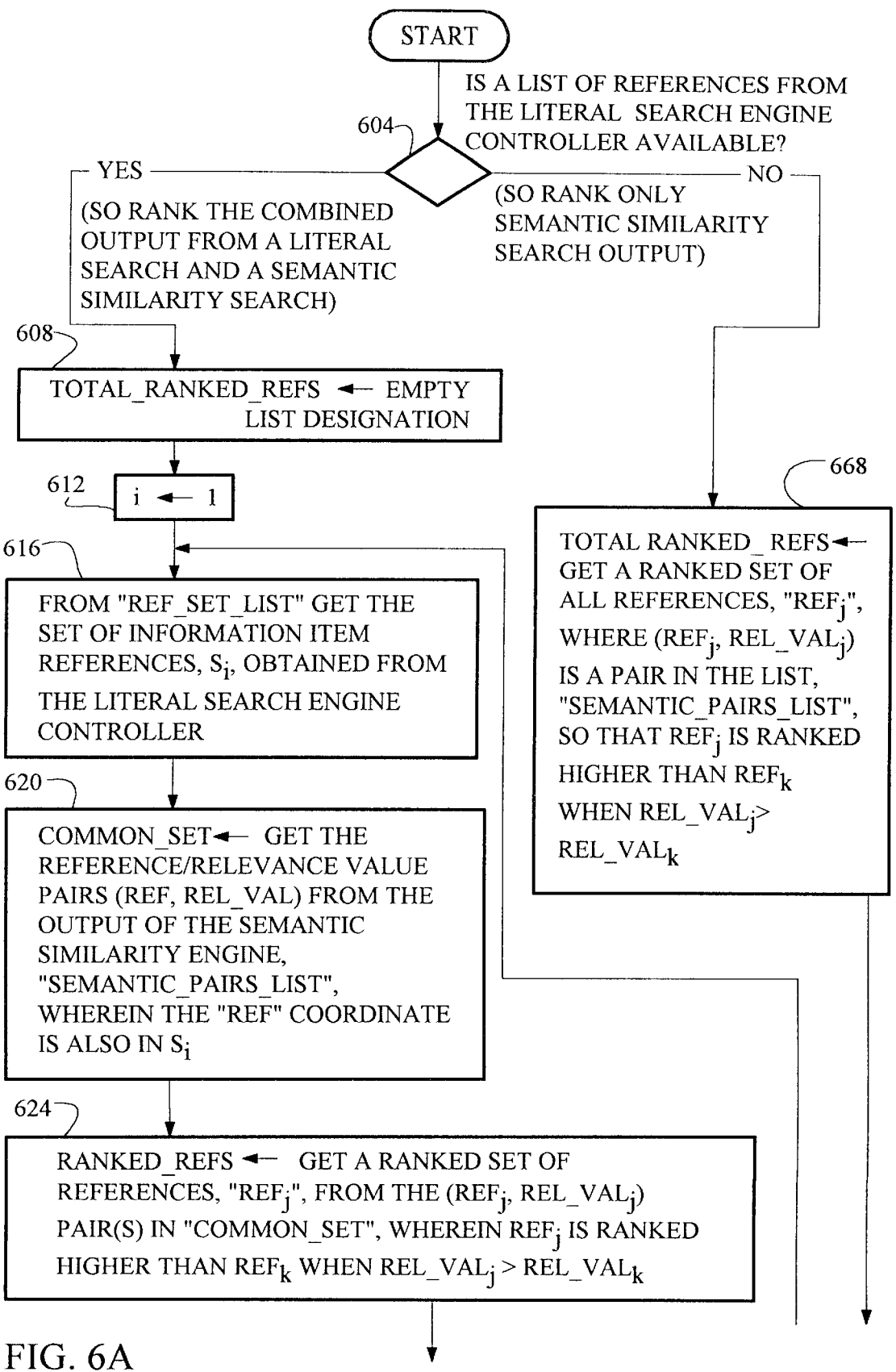
FIGS. 6A–6C provide a flow chart of the high level steps performed by the information item ranking module when combining the outputs from the literal and semantic similarity search engine controllers.
Figure 6B:
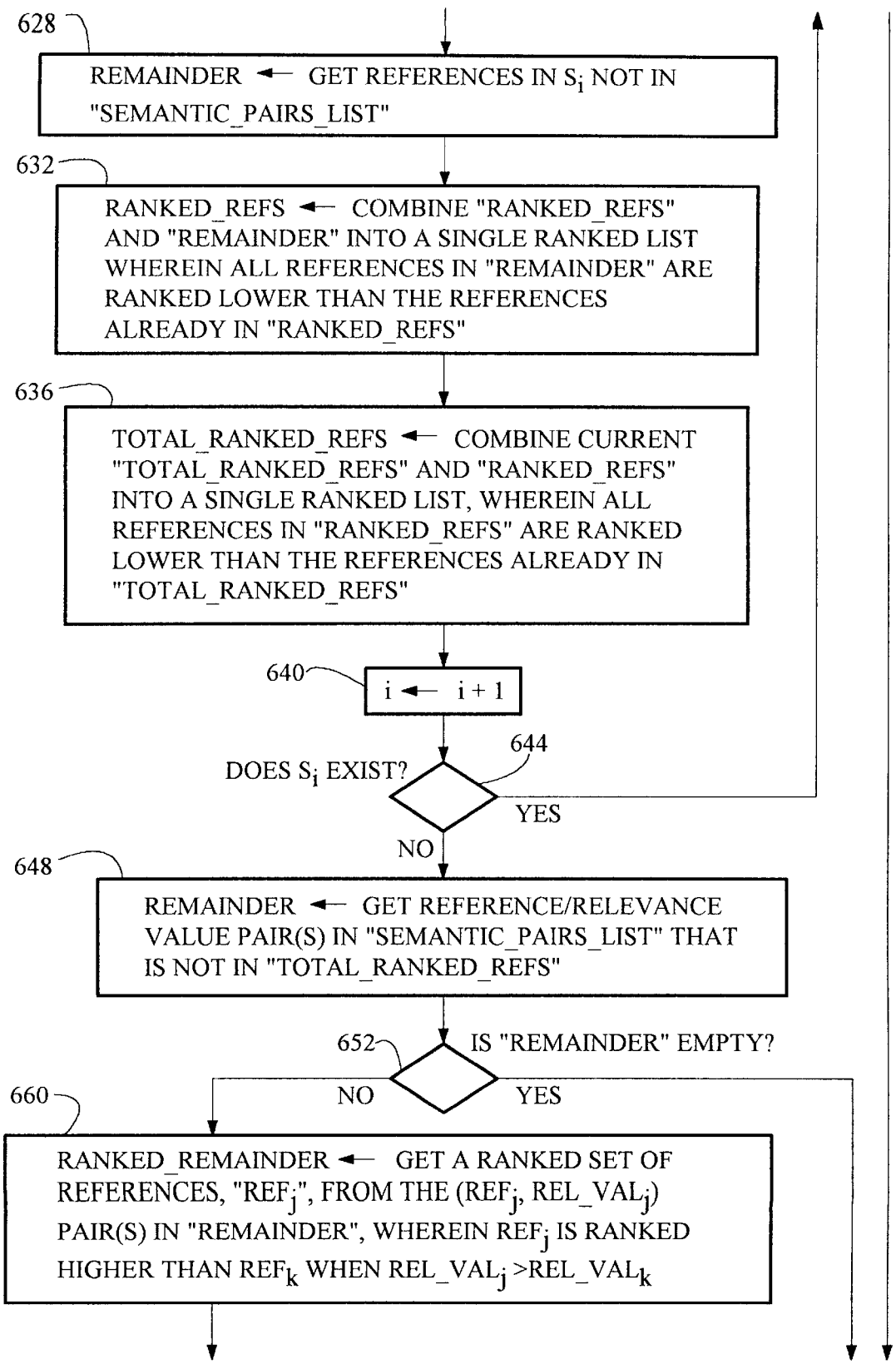
Figure 6C:
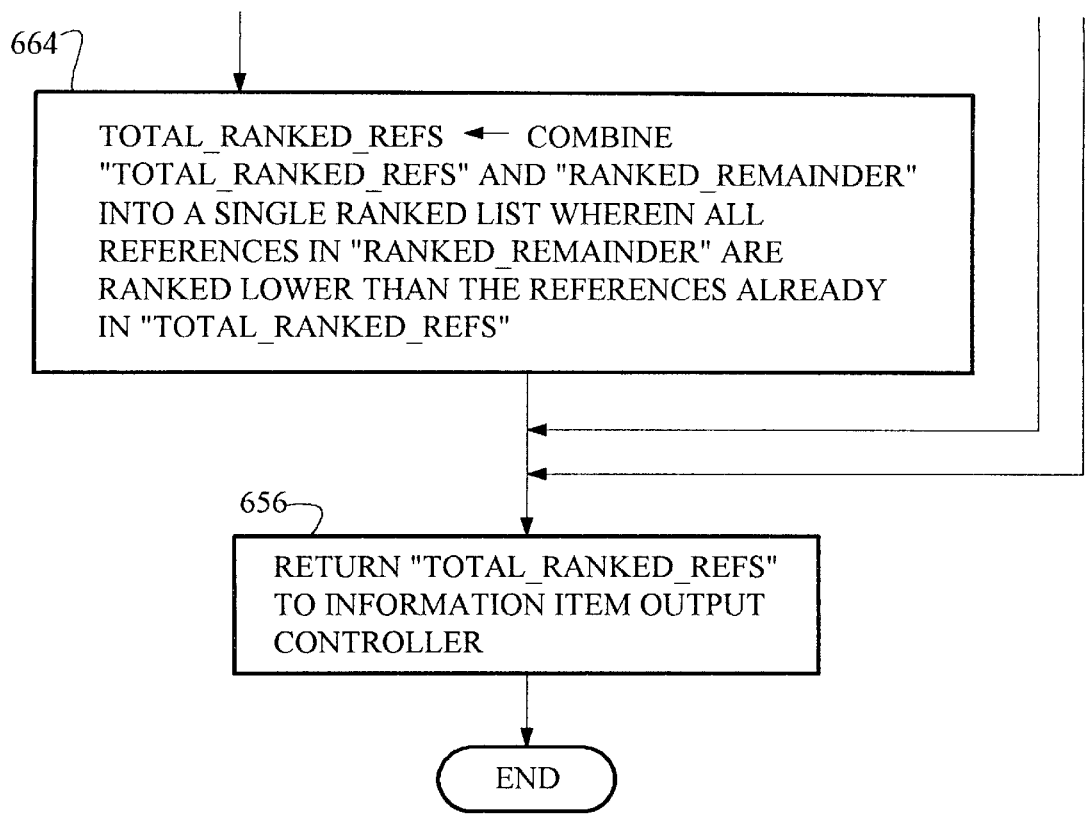

FIGS. 6A, 6B and 6C present the high level steps performed by the information item ranking module 54. Accordingly, in step 604, the information item ranking module 54 determines whether a list of references from the literal search engine controller 34 is available as one of the inputs from the information item output controller 30. If this list of references is available, then both the literal search engine 14 and the semantic similarity search engine 18 have been invoked and the resulting reference lists have been supplied by the information item output controller 30. Accordingly, in step 608, the list of ranked references to be output, TOTAL_RANKED_REFS, is initialized to the empty list. Subsequently, in step 612, the variable, i, is initialized in preparation for entering the loop of steps 616 through 644 that iteratively ranks each set of references S$_i$ in the reference list, REF_SET_LIST, obtained from the literal search engine controller 34. That is, in step 616, the reference set, S$_i$, is obtained, and in step 620, the set of common references in both S$_i$ and the reference list obtained from the semantic similarity search engine controller 38 are assigned to the variable, COMMON_SET. In particular, the variable COMMON_SET includes the reference/relevance value pair (REF, REL_VAL), from the SEMANTIC_PAIRS_LIST, wherein the REF coordinate of these pairs is also in S$_i$. Subsequently, in step 624, the variable, RANKED_REFS, is assigned a ranked set or list of references from the reference/relevance value pairs in COMMON_SET. That is, RANKED_REFS includes an ordered set of references, wherein for any two such references REF$_j$ and REF$_k$, REF$_j$ is ranked higher than REF$_k$ whenever REL_VAL$_j$ is greater than REL_VAL$_k$. Subsequently, in step 628, the remainder of the references in the reference set S$_i$ not referenced in the reference/relevance value pairs of the list, SEMANTIC_PAIRS_LIST, is assigned to the variable, REMAINDER. Following this step, in step 632 the references in REMAINDER are ordered in any desired manner and concatenated onto the list, RANKED_REFS, so that the references in REMAINDER are ranked lower than the other references in RANKED_REFS. Subsequently, in step 636, the variable, TOTAL_RANKED_REFS, for providing the ranked references to be output to the information item output controller 30, has the ranked references in RANKED_REFS concatenated onto it, wherein all references in RANKED_REFS are ranked lower than any references already in TOTAL_RANKED_REFS. Subsequently, in steps 640 and 644 a determination is made as to whether there are further reference sets S$_i$ in the reference list, REF_SET_LIST, obtained from the literal search engine controller 34. Note that if another such reference set exists that has not been processed by the loop presently being discussed, then step 616 is again performed with the newly incremented i.

It is important to note that the loop of steps 616 through 644 utilizes the implicit or canonical orderings of the reference lists output by the search engine controllers in ranking the references in this loop. Note that the larger the i on the reference set $S_i$, the higher likelihood that the references in this set are desired by the user in that a greater number of the query terms supplied by the user have been matched for these references. Accordingly, as is incremented in this loop, the references being ranked are assumed to become more relevant to the user.

Referring again to step 644, if there are no further references in a reference set $S_i$ to process, then step 648 is performed wherein for any remaining reference/relevance value pairs in SEMANTIC_PAIRS_LIST whose REF coordinates are not provided in TOTAL_RANKED_REFS, then these reference/relevance value pairs are assigned, as a set, to the variable, REMAINDER. Subsequently, in step 652 a determination is made as to whether the variable, REMAINDER, is empty. If so, then all references have been ranked in TOTAL_RANKED_REFS and this ranked list of references is output to the information item output controller 30 in step 656. Alternatively, if REMAINDER is not empty, then step 660 is performed wherein the references in the reference/relevance value pairs of REMAINDER are ranked according to their REL_VAL coordinates as described in step 660. Subsequently, in step 664, the list of ranked references, RANKED_REMAINDER, provided in step 660 are incorporated into the ranked list of references TOTAL_RANKED_REFS so that the newly added references are ranked lower than any references already in TOTAL_RANKED_REFS. Subsequently, as discussed hereinabove, step 656 is performed wherein the reference list TOTAL_RANKED_REFS is output to the information item output controller 30.

Referring once again to step 604, if in this step it is determined that only an ordered list of references from the semantic similarity search is provided, then in step 668, the list, TOTAL_RANKED_REFS, is constructed wherein the references REF from the reference/relevance value pairs are ordered according to the relevance values. Subsequently, step 656 is performed for outputting this list.

Simple Example Illustrating the Semantic Similarity Engine 18

The contents of Table 1 below are used to illustrate how semantic structure analysis of the similarity search engine 18 works and to point out the differences between this method and conventional keyword or literal matching.

TABLE 1

Document Set Based on Titles c1: *Human* machine *interface* for Lab ABC *computer* applications
c2: A *survey* of *user* opinion of *computer system response time*
c3: The *EPS user interface* management *system*
c4: *Systems* and *human systems* engineering testing of *EPS*-2
c5: Relation of *user*-perceived *response time* to error measurement
m1: The generation of random, binary, unordered *trees*
m2: The intersection graph of paths in *trees*
m3: *Graph minors* IV: Widths of *trees* and well-quasi-ordering
m4: *Graph minors*: A *survey*

In this example, a file of text objects consists of nine titles of technical documents with titles c1–c5 concerned with human/computer interaction and titles m1–m4 concerned with mathematical graph theory. In Table 1, words occurring in more than one title are italicized. Using conventional keyword retrieval, if a user requested papers dealing with "human computer interaction", titles c1, c2, and c4 would be returned, since these titles contain at least one keyword from the user request. However, c3 and c5, while related to the query, would not be returned since they share no words in common with the request. It is now shown how latent semantic structure analysis treats this request to return titles c3 and c5.

Table 2 depicts the "term-by-document" matrix (i.e., term by information item matrix) for the 9 technical document titles. Each cell entry, (i,j), is the frequency of occurrence of term i in document j. This basic term-by-document matrix or a mathematical transformation (function) thereof is used as input to the statistical procedure described below. For instance, such a mathematical transformation or function may be one of the following: log entropy, term frequency inverse document frequency (TFIDF), and inverse document frequency (IDF) as one skilled in the art will understand.

TABLE 2

| TERMS | DOCUMENTS | | | | | | | | |
|---|---|---|---|---|---|---|---|---|---|
| | c1 | c2 | c3 | c4 | c5 | m1 | m2 | m3 | m4 |
| human | 1 | 0 | 0 | 1 | 0 | 0 | 0 | 0 | 0 |
| interface | 1 | 0 | 1 | 0 | 0 | 0 | 0 | 0 | 0 |
| computer | 1 | 1 | 0 | 0 | 0 | 0 | 0 | 0 | 0 |
| user | 0 | 1 | 1 | 0 | 1 | 0 | 0 | 0 | 0 |
| system | 0 | 1 | 1 | 2 | 0 | 0 | 0 | 0 | 0 |
| response | 0 | 1 | 0 | 0 | 1 | 0 | 0 | 0 | 0 |
| time | 0 | 1 | 0 | 0 | 1 | 0 | 0 | 0 | 0 |
| EPS | 0 | 0 | 1 | 1 | 0 | 0 | 0 | 0 | 0 |
| survey | 0 | 1 | 0 | 0 | 0 | 0 | 0 | 0 | 1 |
| tree | 0 | 0 | 0 | 0 | 0 | 1 | 1 | 1 | 0 |
| graph | 0 | 0 | 0 | 0 | 0 | 0 | 1 | 1 | 1 |
| minor | 0 | 0 | 0 | 0 | 0 | 0 | 0 | 1 | 1 |

Figure 7:
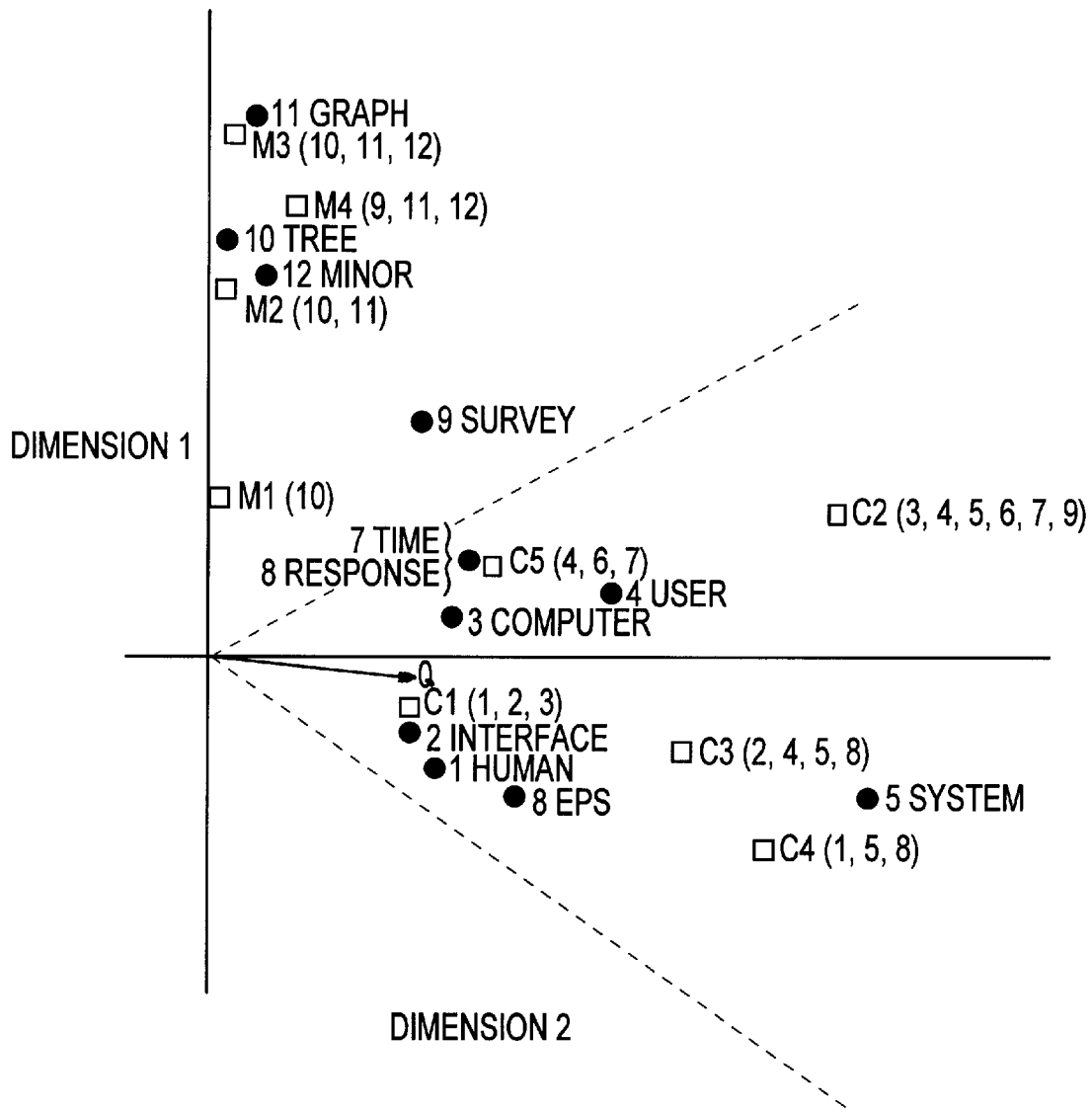
FIG. 7 is a plot of the "term" coordinates and the "document" coordinates based on a two-dimensional singular value decomposition of an original "term-by-document" matrix.

For this example the documents and terms have been carefully selected to yield a good approximation in just two dimensions for expository purposes. FIG. 7 is a two dimensional graphical representation of the two largest dimensions resulting from the statistical process, singular value decomposition. Both document titles and the terms used in them are fit into the same space. Terms are shown as circles and labeled by number. Document titles are represented by squares with the numbers of constituent terms indicated parenthetically. The cosine or dot product between two objects (terms or documents) describe their estimated similarity. In this representation, the two types of documents form two distinct groups: all the mathematical graph theory occupy the same region in space (basically along Dimension 1 of FIG. 7) whereas a quite distinct group is formed for human/computer interaction titles (essentially along Dimension 2 of FIG. 7).

To respond to a user query about "human computer interaction," the query is first folded into this two-dimensional space using those query terms that occur in the space (namely, "human" and "computer"). The query vector is located in the direction of the weighted average of these constituent terms, and is denoted by a directional arrow labeled "Q" in FIG. 7. A measure of closeness or similarity is related to the angle between the query vector and any given term or document vector. One such measure is the cosine between the query vector and a given term or document vector. In FIG. 7 the cosine between the query vector and each c1–c5 titles is greater than 0.90; the angle corresponding to the cosine value of 0.90 with the query is shown by the dashed lines in FIG. 7. With this technique, documents c3 and c5 would be returned as matches to the user query, even though they share no common terms with the query. This is because the latent semantic structure (represented in FIG. 7) fits the overall pattern of term usage across documents.

Description of Singular Value Decomposition

To obtain the data to plot FIG. 7, the "term-by-document" matrix of Table 2 is decomposed using singular value decomposition (SVD). A reduced SVD is employed to approximate the original matrix in terms of a much smaller number of orthogonal dimensions. This reduced SVD is used for retrieval; it describes major associational structures in the matrix but it ignores small variations in word usage. The number of dimensions to represent adequately a particular domain is largely an empirical matter. If the number of dimensions is too large, random noise or variations in word usage will be remodeled. If the number of dimensions is too small, significant semantic content will remain uncaptured. For diverse information sources, 100 or more dimensions may be needed.

To illustrate the decomposition technique, the term-by-document matrix, denoted Y, is decomposed into three other matrices, namely, the term matrix (TERM), the document matrix (DOCUMENT), and a diagonal matrix of singular values (DIAGONAL), as follows:

$$Y_{t,d} = TERM_{t,m} \times DIAGONAL_{m,m} \times DOCUMENT^T_{m,d}$$

where Y is the original t-by-d matrix, TERM is a t-by-m term matrix with unit length orthogonal columns, DOCUMENT is a d-by-m document matrix with unit-length orthogonal columns, and DIAGONAL is the m-by-m diagonal matrix of singular values typically ordered by magnitude. The dimensionality of the full solution, denoted m, is the rank of the t-by-d matrix, that is, $m \leq \min(t,d)$. Tables 3, 4 and 5 below show the TERM and DOCUMENT matrices and the diagonal elements of the DIAGONAL matrix, respectively, as found via SVD.

TABLE 5

DIAGONAL (9 singular values)

| 3.34 | 2.54 | 2.35 | 1.64 | 1.50 | 1.31 | 0.84 | 0.56 | 0.36 |

As alluded to earlier, data to plot FIG. 7 was obtained by presuming that two-dimensions are sufficient to capture the major associational structure of the t-by-d matrix, that is, m is set to two in the expression for $Y_{td}$, yielding an approximation of the original matrix. Only the first two columns of the TERM and DOCUMENT matrices are considered with the remaining columns being ignored. Thus, the term data point corresponding to "human" in FIG. 7 is plotted with coordinates (0.22,−0.11), which are extracted from the first row and the two left-most columns of the TERM matrix. Similarly, the document data point corresponding to title m1 has coordinates (0.00,0.19) coming from row six and the two left-most columns of the DOCUMENT matrix.

General Model Details

It is now elucidating to describe in somewhat more detail the mathematical model underlying the latent structure, singular value decomposition technique.

Any rectangular matrix Y of t rows and d columns, for example, a t-by-d matrix of terms and documents, can be decomposed into a product of three other matrices:

$$Y = T_o S_o D^T_o, \qquad (1)$$

such that $T_o$ and $D_o$ have unit-length orthogonal columns (i.e., $T_o^T T_o = I$; $D_o^T D_o = I$) and $S_o$ is diagonal. This is called the singular value decomposition (SVD) of Y. (A procedure for SVD is described in the text *Numerical Recipes*, by Press, Flannery, Teukolsky and Vetterling, 1986, Cambridge University Press, Cambridge, England). $T_o$ and $D_o$ are the

TABLE 3

TERM MATRIX (12 terms by 9 dimensions)

| human | 0.22 | −0.11 | 0.29 | −0.41 | −0.11 | −0.34 | −.52 | −0.06 | −0.41 |
|---|---|---|---|---|---|---|---|---|---|
| interface | 0.20 | −0.07 | 0.14 | −0.55 | 0.28 | 0.50 | −0.07 | −0.01 | −0.11 |
| computer | 0.24 | 0.04 | −0.16 | −0.59 | −0.11 | −0.25 | −0.30 | 0.06 | 0.49 |
| user | 0.40 | 0.06 | −0.34 | 0.10 | 0.33 | 0.38 | 0.00 | 0.00 | 0.01 |
| system | 0.64 | −0.17 | 0.36 | 0.33 | −0.16 | −0.21 | −0.16 | 0.03 | 0.27 |
| response | 0.26 | 0.11 | −0.42 | 0.07 | 0.08 | −0.17 | 0.28 | −0.02 | −0.05 |
| time | 0.26 | 0.11 | −0.42 | 0.07 | 0.08 | −0.17 | 0.28 | −0.02 | −0.05 |
| EPS | 0.30 | −0.14 | 0.33 | 0.19 | 0.11 | 0.27 | 0.03 | −0.02 | −0.16 |
| survey | 0.20 | 0.27 | −0.18 | −0.03 | −0.54 | 0.08 | −0.47 | −0.04 | −0.58 |
| tree | 0.01 | 0.49 | 0.23 | 0.02 | 0.59 | −0.39 | −0.29 | 0.25 | −0.22 |
| graph | 0.04 | 0.62 | 0.22 | 0.00 | −0.07 | 0.11 | 0.16 | −0.68 | 0.23 |
| minor | 0.03 | 0.45 | 0.14 | −0.01 | −0.30 | 0.28 | 0.34 | 0.68 | 0.18 |

TABLE 4

DOCUMENT MATRIX (9 documents by 9 dimensions)

| c1 | 0.20 | −0.06 | 0.11 | 0.95 | 0.04 | −0.08 | 0.18 | −0.01 | 0.06 |
|---|---|---|---|---|---|---|---|---|---|
| c2 | 0.60 | 0.16 | −0.50 | −0.03 | −0.21 | 0.02 | −0.43 | 0.05 | 0.24 |
| c3 | 0.46 | −0.13 | 0.21 | 0.04 | 0.38 | 0.07 | −0.24 | 0.01 | 0.02 |
| c4 | 0.54 | −0.23 | 0.57 | 0.27 | −0.20 | −0.04 | 0.26 | −0.02 | 0.08 |
| c5 | 0.28 | 0.11 | −0.50 | 0.15 | 0.33 | 0.03 | 0.67 | −0.06 | −0.26 |
| m1 | 0.00 | 0.19 | 0.10 | 0.02 | 0.39 | −0.30 | −0.34 | 0.45 | −0.62 |
| m2 | 0.01 | 0.44 | 0.19 | 0.02 | 0.35 | −0.21 | −0.15 | −0.76 | 0.02 |
| m3 | 0.02 | 0.62 | 0.25 | 0.01 | 0.15 | 0.00 | 0.25 | 0.45 | 0.52 |
| m4 | 0.08 | 0.53 | 0.08 | −0.02 | −0.60 | 0.36 | 0.04 | −0.07 | −0.45 | matrices of left and right singular vectors and $S_o$ is the diagonal matrix of singular values. By convention, the diagonal elements of $S_o$ are ordered in decreasing magnitude.

With SVD, it is possible to devise a simple strategy for an optimal approximation to Y using smaller matrices. The k largest singular values and their associated columns in $T_o$ and $D_o$ may be kept and the remaining entries set to zero. The product of the resulting matrices is a matrix $Y_R$ which is approximately equal to Y, and is of rank k. The new matrix $Y_R$ is the matrix of rank k which is the closest in the least squares sense to Y. Since zeros were introduced into $S_o$, the representation of $S_o$ can be simplified by deleting the rows and columns having these zeros to obtain a new diagonal matrix S, and then deleting the corresponding columns of $T_o$ and $D_o$ to define new matrices T and D, respectively. The result is a reduced model such that $$Y_R = TSD^T. \qquad (2)$$

The value of k is chosen for each application; it is generally such that $k \geq 100$ for collections of 1000–3000 data objects.

For discussion purposes, it is useful to interpret the SVD geometrically. The rows of the reduced matrices T and D may be taken as vectors representing the terms and documents, respectively, in a k-dimensional space. With appropriate rescaling of the axes, by quantities related to the associated diagonal values of S, dot products between points in the space can be used to access and compare objects. (A simplified approach which did not involve rescaling was used to plot the data of FIG. 7, but this was strictly for expository purposes.) These techniques are now discussed.

Fundamental Comparisons

There are basically three types of comparisons of interest: (i) those comparing two terms; (ii) those comparing two documents or information items; and (iii) those comparing a term and a document or information item. As used throughout, the notion of a text object or data object is general whereas a document is a specific instance of a text object or data object. Also, text or data objects are stored in the computer system in files.

Two Terms: In the data, the dot product between two row vectors of $Y_R$ tells the extent to which two terms have a similar pattern of occurrence across the set of documents. The matrix $Y_R Y_R^T$ is the square symmetric matrix approximation containing all the term-by-term dot products. Using equation (2), $$Y_R Y_R^T = (TSD^T)(TSD^T)^T = TS^2T^T = (TS)(TS)^T. \qquad (3)$$

This means that the dot product between the i-th row and the j-th row of $Y_R$ can be obtained by calculating the dot product between the i-th and j-th rows of the TS matrix. That is, considering the rows of TS as vectors representing the terms, dot products between these vectors give the comparison between the terms. The relation between taking the rows of T as vectors and those of TS as vectors is simple since S is a diagonal matrix; each vector element has been stretched or shrunk by the corresponding element of S.

Two Documents: In this case, the dot product is between two column vectors of Y. The document-to-document dot product is approximated by $$Y_R^T Y_R = (TSD^T)^T (TSD^T) = DS^2 D^T = (DS)(DS)^T. \qquad (4)$$

Thus the rows of the DS matrix are taken as vectors representing the documents, and the comparison is via the dot product between the rows of the DS matrix.

Term and Document: This comparison is somewhat different. Instead of trying to estimate the dot product between rows or between columns of Y, the fundamental comparison between a term and a document is the value of an individual cell in Y. The approximation of Y is simply equation (2), i.e., $Y_R = TSD^T$. The i,j cell of $Y_R$ may therefore be obtained by taking the dot product between the i-th row of the matrix $TS^{1/2}$ and the j-th row of the matrix $DS^{1/2}$. While the "within" (term or document) comparisons involve using rows of TS and DS as vectors, the "between" comparison requires $TS^{1/2}$ and $DS^{1/2}$ for coordinates. Thus it is not possible to make a single configuration of points in a space that will allow both "between" and "within" comparisons. They will be similar, however, differing only by a stretching or shrinking of the dimensional elements by a factor $S^{1/2}$.

Representations of Pseudo-Objects

The previous results show how it is possible to compute comparisons between the various objects associated with the rows or columns of Y. It is very important in information retrieval applications to compute similar comparison quantities for objects such as queries that do not appear explicitly in Y. For example, it is necessary to be able to take a completely novel query, find a location in the k-dimensional latent semantic space for it, and then evaluate its cosine or inner product with respect to terms or objects in the space. Another example would be trying, after-the-fact, to find representations for documents that did not appear in the original space. The new objects for both these examples are equivalent to objects in the matrix Y in that they may be represented as vectors of terms. For this reason they are called pseudo-documents specifically or pseudo-objects generically. In order to compare pseudo-documents to other documents, the starting point is defining a pseudo-document vector, designated $Y_q$. Then a representation $D_q$ is derived such that $D_q$ can be used just like a row of D in the comparison relationships described in the foregoing sections. One criterion for such a derivation is that the insertion of a real document $Y_i$ should give $D_i$ when the model is ideal (i.e., $Y = Y_R$). With this constraint, $$Y_q = TSD_q^T$$

or, since $T^T T$ equals the identity matrix, $$D_q^T = S^{-1} T^T Y_q$$

or, finally, $$D_q = Y_q^T T S^{-1}. \qquad (5)$$

Thus, with appropriate rescaling of the axes, this amounts to placing the pseudo-object at the vector sum of its corresponding term points. Then $D_q$ may be used like any row of D and, appropriately scaled by S or $S^{1/2}$, can be used like a usual document vector for making "within" and "between" comparisons. It is to be noted that if the measure of similarity to be used in comparing the query against all the documents is one in which only the angle between the vectors is important (such as the cosine), there is no difference for comparison purposes between placing the query at the vector average or the vector sum of its terms.

Illustrative Embodiment

The foundation principles presented in the foregoing sections are now applied to a practical example as a way of teaching an illustrative embodiment in accordance with the present invention.

The system under consideration is one that receives a request for technical information from a user and returns as a response display the most appropriate groups in a large, technically diverse company dealing with that technical information.

If each group can be described by a set of terms, then the latent semantic indexing procedure can be applied. For instance, one set of textural descriptions might include annual write-ups each group member must prepare in describing the planned activity for the coming year. Another input could be the abstracts of technical memoranda written by members of each group.

Figure 8:
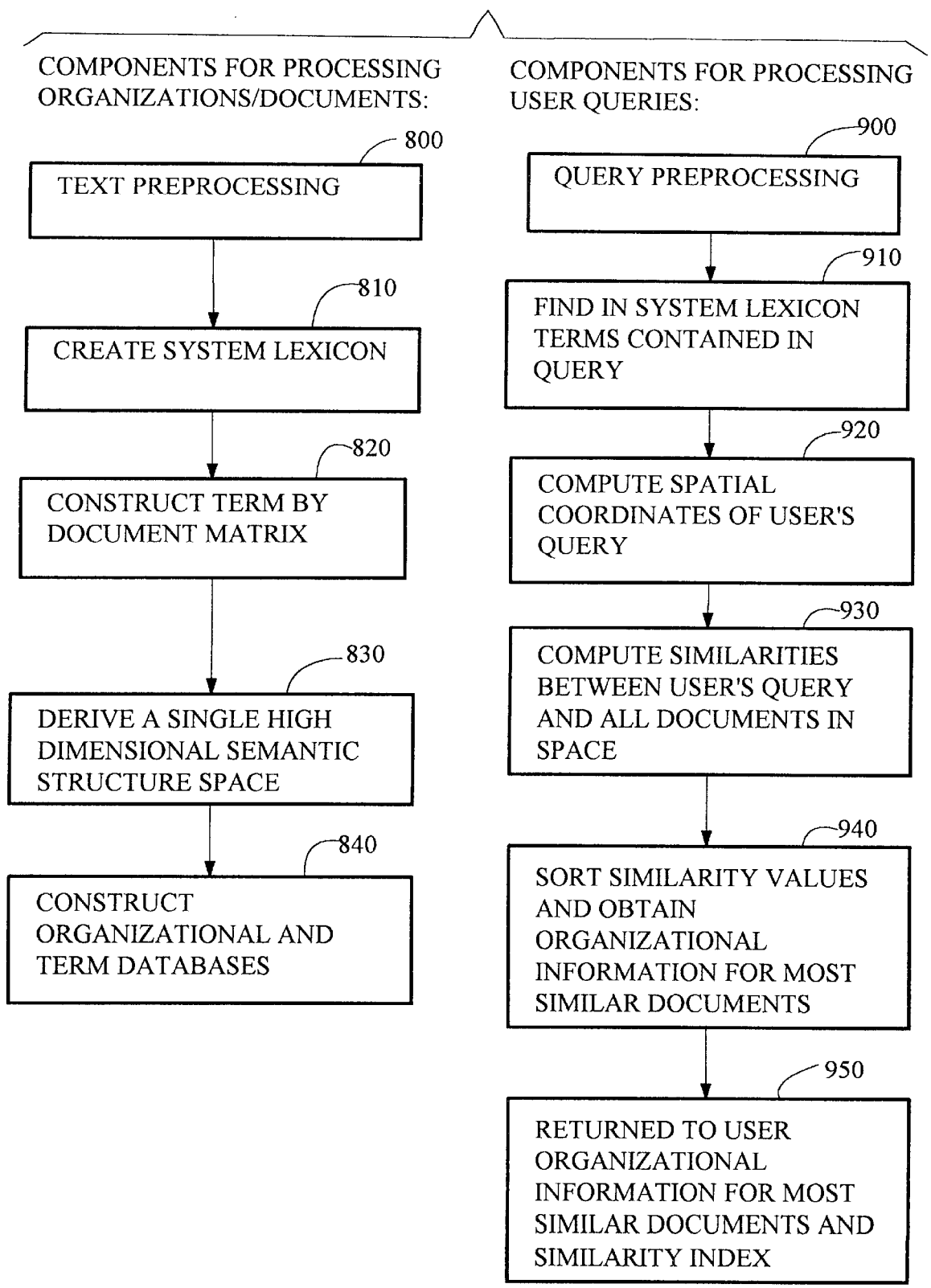
FIG. 8 is a flow diagram depicting the processing to generate the "term" and "document" matrices using singular value decomposition as well as the processing of a user's query.

The technique for processing the documents gathered together to represent the company technical information is shown in block diagram form in FIG. 8. The first processing activity, as illustrated by processing block 800, is that of text processing. All the combined text is preprocessed to identify terms. The next step to the processing is represented by block 810 in FIG. 8. Based upon the earlier text preprocessing, a system lexicon is created.

From the list of lexicon terms, the Term-by-Document matrix is created, as depicted by processing block 820 in FIG. 8. In one exemplary situation, the matrix contained 7100 terms and 728 documents representing 480 groups.

The next step is to perform the singular value decomposition on the Term-by-Document matrix, as depicted by processing block 830. This analysis is only effected once (or each time there is a significant update in the storage files).

The last step in processing the documents prior to a user query is depicted by block 840. In order to relate a selected document to the group responsible for that document, an organizational database is constructed. This latter database may contain, for instance, the group manager's name and the manager's mail address.

The user query processing activity is depicted on the right-hand side of FIG. 8. The first step, as presented by processing block 900, is to preprocess the query in the same way as the original documents.

As then depicted by block 910, the terms are extracted from the query. For each query term also contained in the system lexicon, the k-dimensional vector is located. The query vector is the weighted vector average of the k-dimensional vectors. Processing block 920 depicts the generation step for the query vector.

The next step in the query processing is depicted by processing block 930. In order that the best matching document is located, the query vector is compared to all documents in the space. The similarity metric used is the cosine between the query vector and the document vectors. A cosine of 1.0 would indicate that the query vector and the document vector were on top of one another in the space. The cosine metric is similar to a dot product measure except that it ignores the magnitude of the vectors and simply uses the angle between the vectors being compared.

The cosines are sorted, as depicted by processing block 940, and for each of the best N matching documents (typically N=8), the value of the cosine along with organizational information corresponding to the document's group are displayed to the user, as depicted by processing block 950. Table 6 shows a typical input and output for N=5.

TABLE 6

| INPUT QUERY: | An Expert/Expert-Locating System Based on Automatic Representation of Semantic Structure |
|---|---|
| OUTPUT RESULTS: | |
| 1. Group: B | |
| Group Title: | Artificial Intelligence and Information Science Research |
| Group Manager: | D. E. Walker, Address B, Phone B |
| Fit (Cosine): | 0.67 |
| 2. Group: A | |
| Group Title: | Artificial Intelligence and Communications Research |
| Group Manager: | L. A. Streeter, Address A, Phone A |
| Fit (Cosine): | 0.64 |

TABLE 6-continued

| 3. Group: E | |
|---|---|
| Group Title: | Cognitive Science Research |
| Group Manager: | T. K. Landauer, Address E, Phone E |
| Fit (Cosine): | 0.63 |
| 4. Group: C | |
| Group Title: | Experimental Systems |
| Group Manager: | C. A. Riley, Address C, Phone C |
| Fit (Cosine): | 0.62 |
| 5. Group: D | |
| Group Title: | Software Technology |
| Group Manager: | C. P. Lewis, Address D, Phone D |
| Fit (Cosine): | 0.55 |

The foregoing discussion of the invention has been presented for purposes of illustration and description. Further, the description is not intended to limit the invention to the form disclosed herein. Consequently, variation and modification commensurate with the above teachings, within the skill and knowledge of the relevant art are within the scope of the present invention. The embodiment described herein above is further intended to explain the best mode presently known of practicing the invention and to enable others skilled in the art to utilize the invention as such, or in other embodiments, and with various modifications required by their particular application or use of the invention. It is intended that the appended claims be construed to include alternate embodiments to the extent permitted by prior art.

What is claimed is:

1. A method for obtaining desired information, comprising:

storing a plurality of information items having text;

establishing a means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

receiving a query for querying said plurality of information items for the desired information, the query having a first set of one or more query terms and said first set including a subset having at least one of said query terms from said collection;

first inputting a literal search set of at least one query term from said first set to a first search means for determining when there is an occurrence of a literal query term from said literal search set in any of said plurality of information items;

second inputting said at least one query term from said subset to a second search means, said second search means for determining a semantic similarity with any of said plurality of information items using said means for measuring a semantic similarity;

first retrieving, by applying said first search means to said literal search set, a first group of one or more information items from said plurality of information items in which there is at least one occurrence of a literal query term from said literal search set;

second retrieving, by applying said second search means to said at least one query term from said subset, a second group of one or more information items from said plurality of information items as candidates for providing the desired information;

ranking a combination of information items, said combination obtained by combining said first group and said second group, wherein higher ranked information items are expected to more likely provide the desired information than lower ranked information items; and outputting at least a highest ranked information item in response to the query.

2. A method as claimed in claim 1, further including a step of ordering at least one of said first and second groups with an ordering according to a likelihood that an ordered information item provides the desired information.

3. A method as claimed in claim 2, wherein said order is such that a higher ordered information item is expected to more likely provide the desired information than a lower ordered information item.

4. A method as claimed in claim 2, wherein said step of ranking includes ranking said higher ordered information item higher than said lower ordered information item.

5. A method as claimed in claim 1, wherein said step of receiving includes inputting the query to a World Wide Web website.

6. A method as claimed in claim 1, wherein a majority of said query terms in said subset are input to said first search means.

7. A method as claimed in claim 1, wherein said step of first retrieving includes performing a Boolean query operation between sets having representations of said information items, wherein for each said set, the information items represented in the set have a representation of a common occurrence of one of said query terms of said literal search set in common.

8. A method as claimed in claim 1, wherein said step of first retrieving includes comparing a character string representing a query term of said literal search set with a character string of one of said information items.

9. A method as claimed in claim 1, wherein said step of establishing includes determining a vector space obtained from a term by information item frequency matrix, said term by information item frequency matrix having, for each said term of said collection and for each information item in said plurality of information items, an entry corresponding to said function of a number of occurrences representing the term in the information item.

10. A method as claimed in claim 9, wherein said step of second inputting includes determining a vector related to the query, the vector being in said vector space.

11. A method as claimed in claim 9, wherein said step of determining includes reducing a dimension of said term by information item frequency matrix for obtaining a dimensionality of said vector space that is less than a dimensionality of said term by information item frequency matrix.

12. A method as claimed in claim 11, wherein said step of reducing includes performing one of a singular value decomposition, a linear decomposition and a principal components extraction.

13. A method as claimed in claim 1, wherein said step of ranking includes assigning a higher ranking to said information items having a greater number of representations of the query terms of said literal search set.

14. A method as claimed in claim 1, wherein said step of second retrieving includes ordering at least some of said information items of said second group according to a similarity with the query terms of said subset, wherein said similarity is determined using a vector representation of said subset of query terms and a vector representation of each of said information items, so that when said similarity for a first information item is higher than for a second information item, then said first information item is ordered higher than said second information item.

15. A method as claimed in claim 14, wherein said step of ordering includes determining a measurement of a closeness of said vector representation for each said information item of said second group to said vector representation of said subset of query terms, wherein each said vector representation is from a vector space derived from a term by information item frequency matrix having, for each particular term of said collection and each particular information item of said information items, an entry dependent on said function of a number of occurrences representing the particular term in the particular information item.

16. A method for obtaining desired information, comprising:

storing a plurality of information items having text and including telecommunications contacting codes for one of service and product information;

establishing a means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

receiving a query for querying said plurality of information items for the desired information, the query having a first set of one or more query terms and said first set including a subset having at least one of said query terms from said collection;

first inputting a literal search set of at least one query term from said first set to a first search means for determining when there is an occurrence of a literal query term from said literal search set in any of said information items;

second inputting said at least one query term from said subset to a second search means, said second search means for determining a semantic similarity with said information items using said means for measuring a semantic similarity;

first retrieving, by applying said first search means to said literal search set, a first group of one or more information items in which there is at least one occurrence of a literal query term from said literal search set;

second retrieving, by applying said second search means to said at least one query term from said subset, a second group of one or more information items as candidates for providing the desired information;

ranking a combination of said information items obtained from said first group and said second group, wherein higher ranked information items are expected to more likely provide the desired information than lower ranked information items; and outputting at least a highest ranked information item in response to the query.

17. A method as claimed in claim 16, wherein said contacting codes include one or more of a telephone number and a network address.

18. A method for obtaining desired information, comprising:

storing a plurality of information items having text;

establishing a means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

receiving a query for querying said plurality of information items for the desired information, the query having a first set of one or more query terms and said first set including a subset having at least one of said query terms from said collection;

first inputting a literal search set of at least one query term from said first set to a first search means for determining when any of said information items have an occurrence of a character string representing a query term from said literal search set;

second inputting said at least one query term from said subset to a second search means, said second search means for determining a semantic similarity with said information items using said means for measuring a semantic similarity;

first retrieving, by applying said first search means to said literal search set, a first group of one or more information items as candidates for providing the desired information, wherein, for a predetermined number N, the information items having representations of at least N of the query terms of said literal search set are selected for retrieval;

second retrieving, by applying said second search means to said at least one query term from said subset, a second group of one or more information items as candidates for providing the desired information;

ranking a combination of said information items obtained from said first group and said second group, wherein higher ranked information items are expected to more likely provide the desired information than lower ranked information items; and outputting at least a highest ranked information item in response to the query.

19. A method for obtaining desired information, comprising:

storing a plurality of information items having text;

establishing a means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

receiving a query for querying said plurality of information items for the desired information, the query having a first set of one or more query terms and said first set including a subset having at least one of said query terms from said collection;

first inputting a literal search set of at Least one query term from said first set to a first search means for determining when there is an occurrence of a literal query term from said literal search set in any of said plurality of information items;

second inputting said at least one query term from said subset to a second search means, said second search means for determining a semantic similarity with any of said plurality of information items using said means for measuring a semantic similarity;

first retrieving, by applying said first search means to said literal search set, a first group of one or more information items from said plurality of information items in which there is at least one occurrence of a literal query term from said literal search set;

second retrieving, by applying said second search means to said at least one query term from said subset, a second group of one or more information items from said plurality of information items as candidates for providing the desired information;

ranking a combination of information items, said combination obtained by combining said first group and said second group, wherein higher ranked information items are expected to more likely provide the desired information than lower ranked information items, wherein said step of ranking includes assigning a higher ranking to said information items having a greater number of appearances of the query terms of said literal search set and includes assigning a higher rank to a first information item than a second information item, when (a) there is an identical number of appearances of query terms from said literal search set in each of said first and second information items, (b) said first and second information items are in said second group retrieved by said second search means, wherein said second group is ordered so that information items of said second collection having a greater similarity to said query terms of said subset are ordered higher, and (c) said first information item is ordered higher than said second information item in said second group; and outputting at least a highest ranked information item in response to the query.

20. An apparatus for retrieving desired information, comprising:

means for storing a plurality of information items having text;

means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

means for receiving a query for querying said plurality of information items for the desired information, the query having a first set of one or more query terms;

a literal search set having at least one query term from said first set;

first search engine for selecting said information items independent of a content of other of said information items when there is an occurrence of a literal query term from said literal search set in any of said plurality of information items;

second search engine for selecting said information items depending on a content of other of said information items using said means for measuring a semantic similarity;

wherein at least one of said first and second search engines orders at least some of their selected information items with a particular ordering;

means for inputting into each of said first and second search engines a corresponding search request obtained from the query, wherein said first search engine responds with a first group of information items from said plurality of information items in which there is at least one occurrence of a literal query term from said literal search set and said second search engine responds with a second group of information items from said plurality of information items;

means for ranking at least some of said information items represented in a combined group of said first and second groups, wherein if a first information item and a second information item are ordered by said particular ordering for an ordering for one of said first group and said second group, and unordered for another of said first and second groups, then said first information item and said second information item are ranked in accordance with said particular ordering.

21. An apparatus as claimed in claim 20, wherein if said first information item is ordered less than said second information item in said particular ordering, then said first information item is ranked less than said second information item.

22. An apparatus as claimed in claim 20, wherein said means for receiving a query includes transmitting the query through at least one of a telephony network and an Internet network.

23. An apparatus as claimed in claim 20, wherein said first search engine retrieves one of said information items having a text string matching a text string in the query.

24. An apparatus as claimed in claim 20, wherein said first search engine includes a means for performing a Boolean query between sets having representations of said information items wherein for each said set, the information items represented in the set have a representation of an occurrence of a term of the query in common.

25. An apparatus as claimed in claim 20, wherein said second search engine includes a statistical model derived using a term by information item frequency matrix, wherein an entry of said frequency matrix corresponds to a function of a number of occurrences of a predetermined term in a predetermined information item.

26. An apparatus as claimed in claim 25 wherein said statistical model has a lower dimensionality than said frequency matrix.

27. An apparatus as claimed in claim 20, wherein if a third information item is ordered less than a fourth information item according to said particular ordering and said particular ordering is provided by said first search engine, then said third information item is ranked less than said fourth information item.

28. An apparatus as claimed in claim 20, further including a controller for activating said second search engine and supplying a representation of a previously ranked information item, wherein said second search engine uses said representation for selecting information items whose content is determined to be similar to said previously ranked information item.

29. An apparatus for retrieving desired information, comprising:

means for storing a plurality of information items having text and including telecommunications contacting codes for one of service and product information;

means for measuring a semantic similarity between said information items and a collection of terms for querying said information items, wherein said semantic similarity is dependent on, for each said term and for each said information item, a function of a number of occurrences representing the term in said information item in comparison to occurrences representing the term in other of said information items;

means for receiving a query for querying said plurality of information items for the desired information, the query having a first set of one or more query terms;

a literal search set having at least one query term from said first set;

first search engine for selecting said information items independent of a content of other of said information items when there is an occurrence of a literal query term from said literal search set in any of said plurality of information items;

second search engine for selecting said information items depending on a content of other of said information items using said means for measuring a semantic similarity;

wherein at least one of said first and second search engines orders at least some of their selected information items with a particular ordering;

means for inputting into each of said first and second search engines a corresponding search request obtained from the query, wherein said first search engine responds with a first group of information items from said plurality of information items in which there is at least one occurrence of a literal query term from said literal search set and said second search engine responds with a second group of information items from said plurality of information items;

means for ranking at least some of said information items represented in a combined group of said first and second groups, wherein if a first information item and a second information item are ordered by said particular ordering for an ordering for one of said first group and said second group, and unordered for another of said first and second groups, then said first information item and said second information item are ranked in accordance with said particular ordering.

* * * * *